Feb. 21, 1956  E. HELLMICH  2,735,467
APPARATUS FOR CUTTING UP ONIONS AND THE LIKE
Filed April 15, 1950  3 Sheets-Sheet 1

Inventor
Ernst Hellmich
by Jewett, Mead & Brown
attorneys

Feb. 21, 1956      E. HELLMICH      2,735,467

APPARATUS FOR CUTTING UP ONIONS AND THE LIKE

Filed April 15, 1950      3 Sheets-Sheet 2

Feb. 21, 1956 E. HELLMICH 2,735,467
APPARATUS FOR CUTTING UP ONIONS AND THE LIKE
Filed April 15, 1950 3 Sheets-Sheet 3

United States Patent Office 2,735,467
Patented Feb. 21, 1956

2,735,467

APPARATUS FOR CUTTING UP ONIONS AND THE LIKE

Ernst Hellmich, Stuttgart-Botnang, Germany

Application April 15, 1950, Serial No. 156,065

2 Claims. (Cl. 146—78)

This invention concerns an apparatus for cutting up onions or the like by the use of intersecting knives.

In known appliances of this type a plurality of knives are arranged in both directions, giving a grating-like formation. This knife grating has the disadvantage that it is hard to clean, and moreover its manufacture offers difficulties. It is an object of the invention to overcome these disadvantages.

According to the present invention there is provided an apparatus for cutting up onions and the like by the use of intersecting knives, having a longitudinal knife and at right angles to this a number of small transverse knives so arranged that their cutting edges engage the onion or the like before the longitudinal cutting edge.

Thus the longitudinal knife and the cross knives may be formed in one piece or arranged in a common holder made, for example, of pressed material. They can, however, also be constructed separately from one another in such a manner that the cross knives are arranged in a strip like frame and the latter is fastened to the longitudinal knife or the carrier of the latter. Cutting with the knife formed according to the invention can thereby be made easy, so that the cuts of the cross knives pass inclined in direction rising on the longitudinal cutting edge.

To perform the cutting, the new knife can be used in different ways. For example, it can be reciprocable in a straight line, or rotate, or can be arranged stationary and the material to be cut can be displaced relative to it. A particularly simple and easily handled construction results if the longitudinal knife forms a hand lever which is pivoted to a base provided with an onion support. In this case the hand lever is preferably so formed that the longitudinal knife is provided at one end with a handle and at the other with a covering of plastic such as artificial resin.

In order that this hand lever may be held in its ready position, a bearing or supporting spring can be so arranged between it and the base that it can tilt on depressing the lever. The same effect can be attained, however, if the bearing pins of the hand lever are under the influence of tension springs. This construction has the advantage that the bearing remains free of play, because wear is compensated by the tension of the springs. Moreover the hand lever can be guided not only in its bearing but also by projections which are fitted at the base of the appliance. The onion support of the new appliance can advantageously have an edge armed with a steel rail to which is connected a collecting dish.

On the downward motion of the hand lever, the knife, formed according to the invention, cuts off narrow strips of the half onion lying on the support. Since onions are composed of several separate generally spherical shells lying inside one another, these strips break up into single pieces which are larger in the lower part of the half onion than in the upper. In order still further to divide up these pieces, cutting can be carried out also in a third plane, in that on the base of the new appliance is movably arranged a knife support with two or more knives arranged at a small distance one over another perpendicular to the cutting plane of the longitudinal knife.

In a preferred form of the invention, in which the onions lie still and cutting motions are carried out in three planes at right angles to one another, a plate provided with a handle and a cut out portion is pivoted or hinged on an onion support, knives being arranged in the cut out portion in the direction of motion at a small distance from one another, and a longitudinal knife provided with a handle is pivoted displaceably over the cut out section, for example to the plate.

The knives arranged in the cut out portion can be supported against one another in such simple manner that from them lobes are stamped out, and are bent at right angles as distance pieces. These lobes can be provided on the cutting side of the knives preferably also with a cutting edge.

In a further form of construction of the invention there is incorporated a kitchen cutting board, this board forming the collecting surface for the cut up particles of onion. This construction of the invention has the advantage that the stability of the apparatus is increased because of the weight of the cutting board and, moreover, the new appliance has a large collecting surface and on the latter the cut up particles of onion can be worked up further for example chopped or mixed with herbs, etc. Naturally the collecting surface of the invention can quite generally be used as a cutting board. Finally the invention is very simple in its construction, cheap to manufacture, easy to handle and simple to clean.

In a particularly preferable arrangement of the cutting lever on the cutting board, each is mounted with a base on a longitudinal cutting board at one of the broad edges. Thereby the cutting lever can advantageously be mounted partially on the opposite side of the collecting surface, so that the surface of the cutting board remaining free for cutting is as great as possible. A good guiding of the cutting lever can be obtained in a simple manner by pressing the latter by means of a spring or the like against its bearing and the cutting edge of the base. Thereby this spring and the cutting edge rail can advantageously be connected with one another to form one piece, so that the one end of the rail is curved back and rests resiliently on the cutting lever.

To ensure that on the upward movement of the cutting lever on the one hand the latter may remain standing in any angular position and on the other hand the appliance is not lifted, the bearing friction of the cutting lever can be so regulated that its magnitude lies between the weight of the cutting lever and that of the appliance.

The invention will be further described by way of example with reference to the accompanying drawings, which show different embodiments of the invention and in which.

Figure 1:
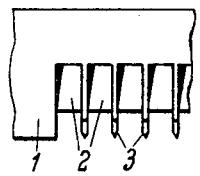
Fig. 1 is a partial side view of one form of cutting lever embodying my invention.

In the drawings, 1 denotes a cutting lever with intersecting knives. In the construction according to Figs. 1 and 2, longitudinal knife 2 and cross knives 3 are worked out of a full steel rail forming the lever 1 so that the cutting edge of the longitudinal knife 2 is arranged parallel to the plane of oscillation of the lever 1 and the cutting edges of the knives 3 at uniform distances in planes parallel to one another perpendicular to the plane of oscillation of the lever.

Figure 3:
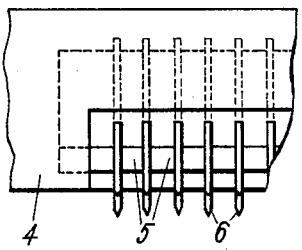
Fig. 3 is a partial side view of a modified form of cutting lever made of artificial resin.
Figure 4:
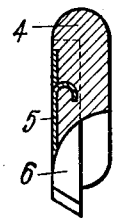
Fig. 4 is a transverse sectional view of the lever of Fig. 3.

In the constructions shown in Figs. 3 and 4 a lever 4 made of artificial resin 4 holds the crossing knife sets, and in fact longitudinal knives 5 with their cutting edges parallel to the oscillation plane are inserted at uniform distances, and mutually parallel transverse cutting edges 6 perpendicular to the oscillation plane.

Figure 5:
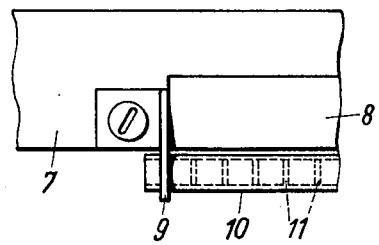
Fig. 5 is a partial side view of a further modified lever utilizing a U-shaped holder for the cross knives.
Figure 6:
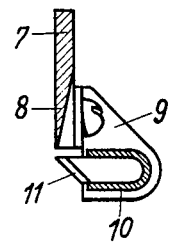
Fig. 6 is a transverse section through the lever of Fig. 5.

In the construction according to Figs. 5 and 6 a lever 7 has a longitudinal knife 8 lying parallel to the oscillation plane with a continuous cutting edge. On both sides of this knife 8 a carrier 9 is connected with the lever 7 and in it is a U-shaped holder 10 which serves to hold cross knives 11 arranged equidistant from and perpendicular to the longitudinal knife 8.

The three cutting levers described all show only a single cutting edge lying parallel to the plane of oscillation of the lever, which cutting edge is either interrupted (Figs. 1–4) or continuous (Figs. 5 and 6). There can, however, be provided several knives arranged parallel to the plane of oscillation. As is apparent from Figs. 2, 4 and 6, the cutting edges lying at right angles to the plane of oscillation are so obliquely positioned relative to the horizontal that on the cutting operation a pressure component directed against the onion occurs which lightens the attack of the corresponding knives. Moreover they are placed lower than the cutting edges of the longitudinal knives so that they can come into engagement before these.

Figure 2:
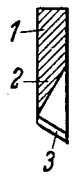
Fig. 2 is a transverse sectional view of the lever of Fig. 1 showing the relationship between the longitudinal knives and the cross knives.
Figure 7:
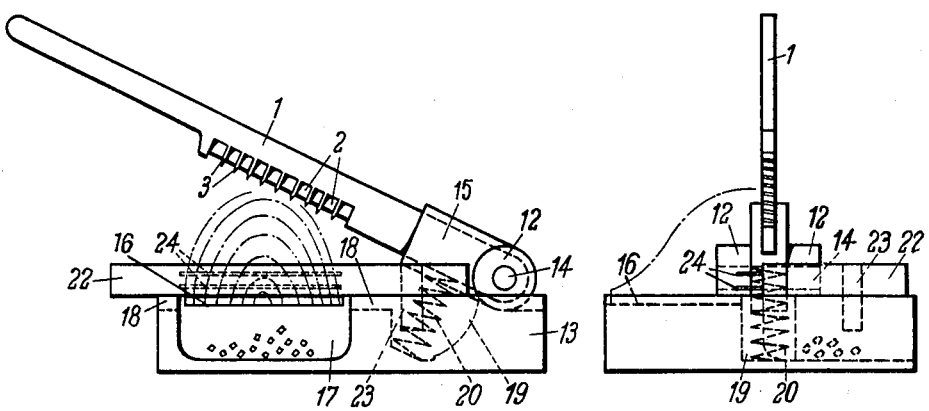
Fig. 7 is a side view of a complete apparatus utilizing knives of the type illustrated in Figs. 2 and 3.
Figure 8:
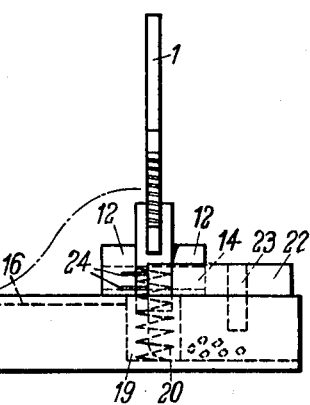
Fig. 8 is an end view of the apparatus of Fig. 7.

Figs. 7 and 8 show a first example of an appliance according to the invention, which is provided with a lever 1 with intersecting knives 2 and 3 of the type shown in Figs. 2 and 3. The vertically oscillatably mounted lever 1 is mounted in the two eyes 12 of a base 13 by means of a bolt 14 and at its lower end is provided with a covering 15 of artificial resin or the like. Thereby the bearing portion of the lever 1 (made for example of galvanized steel) is protected against wear, and as a result against the danger of rusting. The base 13 is provided with a cavity 16 running at right angles to the oscillation plane of the lever 1, which serves as a support for the onion to be cut up and which passes across in the plane of movement of the longitudinal knife 2, forming a cutting edge in a deepened collecting dish 17. This is for the collection of the onion particles falling from the cutting process. A further depression 18 arranged in the base 13 serves to hold the lever 1 in depressed condition. In the range of the lever and clad with artificial resin 15 the base has a niche 19, in which a spring 20 is supported, which acts on the lever part 15 and holds the lever in its ready position. A second lever 22 is arranged horizontally swingable about a bolt 23 mounted in the base 13. At its inner side are two knives 24 horizontally arranged over one another with horizontal cutting edges lying parallel to one another. For the mode of action of the new appliance, the following considerations are of significance:

In order to cut up an onion finely it must be cut in three vertical planes at right angles to one another. By a cut at right angles to the axis of the onion, on account of the shell-like construction of the same, a disc is cut out which consists of almost concentric circular rings. By cutting in the directions of the axis, this disc is divided into more or less large ring pieces, which through a third series of cuts at right angles to the foregoing are further subdivided into approximately equal small pieces. By suitable choice of the distance, for example of the cuts at right angles to the onion axis, the fineness of the subdivision can be altered.

The cutting up of an onion with the appliance shown in Figs. 7 and 8 is as follows. In the ready position the lever takes the position shown in Fig. 7, the lever 22 being somewhat swung out towards the side. Half an onion is laid in the depression 16 with the cut face downwards and with the necessary forward push for the desired degree of cutting up in relation to the mentioned edge of the base 13. Now the lever 22 is pressed against the onion, so that by the attack of the knives 24 the onion rings are cut in two horizontal planes. The lever 22 is again pushed back to its position of readiness and then the lever 1 pressed down. By this means the onion part is submitted to the attack of the knives 2 and 3 and is cut in two planes vertical to one another and to the surface of the onion, and cut particles of onion fall into the collecting dish 17. After pushing back the lever 1 into its position of readiness the onion is pushed forward over the cutting edge of the base 13 by the desired amount, whereupon the levers 2 and 1 can again be actuated in the described series of operations. As is apparent from Fig. 7, the spring 20 is so arranged in the niche 19 that on pressing down the lever 1 it can tilt; by this means the action of the spring can be so far isolated that it does not interrupt on cutting.

Figure 9:
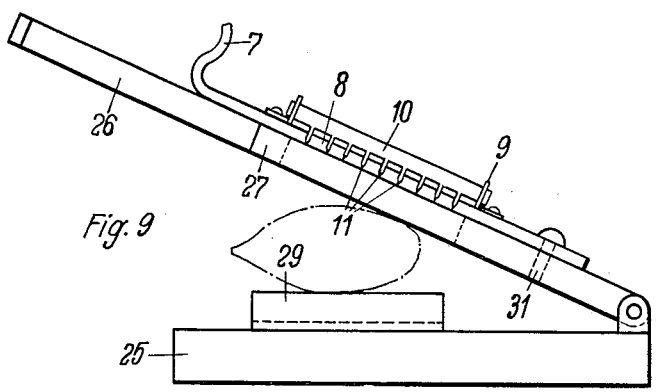
Fig. 9 is a side elevation of a complete apparatus showing an onion in position to be cut by knives of the type illustrated in Figs. 5 and 6.
Figure 11:
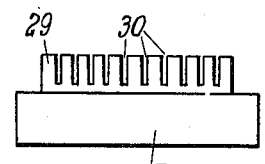
Fig. 11 is a detailed side view of the base shown in Figs. 9 and 10 wherein the base carries a set of vertical knives.
Figure 10:
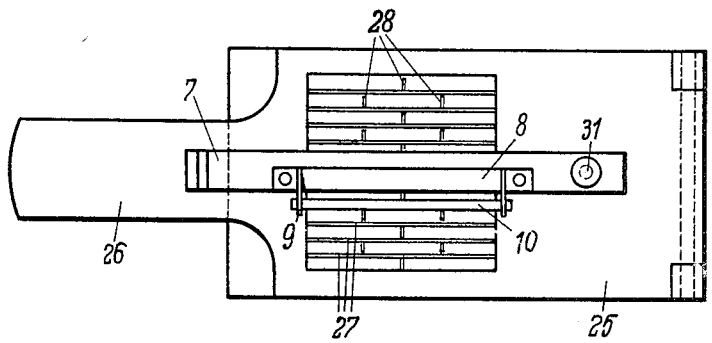
Fig. 10 is a top plan view of the apparatus of Fig. 9.

In the form shown in Figs. 9 to 11 of the construction of the invention a vertically swingable lever plate 26 is mounted in a base 25 and is provided in a cut out portion with longitudinal knives 27, the cutting edges of which lie parallel to the plane of oscillation of the lever 26 and which are supported reciprocally by means of lobes 28 curved out of their plane. These lobes 28 can also be provided with cutting edges on the cutting side of the longitudinal knives 27.

In the range of this knife 27 the base 25 is provided with a bank of knives 29, the slits 30 of which serve to engage the knives 27. At the same time the bank of knives 29 is adapted to act as support for the onion to be cut up. A swingable lever 7 is mounted by means of a bolt 31 on the upper side of the plate 26, which lever 7 is swingable at right angles to the direction of motion of the same and which is formed according to Figs. 5 and 6 and carries the knives 8 and 11.

In this example of construction the onion to be cut up in contrast to the previously described example need not be halved. The mode of action of this apparatus is as follows:

The lever 26 is pressed against the onion arranged on the bank of knives from its position of readiness according to Fig. 9 with the desired forward push, according to which the parts of the onion passing between the longitudinal knives 27 on actuation of the lever 26 by corresponding oscillation of the lever 7 are cut up by means of the knives 8 and 11. On complete depression of the lever 26 the remaining portion of the onion is wholly cut through and the longitudinal knives 27 thus come into engagement with the slits 30 of the bank of knives 29 so that their backs lie in one plane with the surface of the bank of knives. As a result of this, the residue of onion can be completely chopped up in the manner described by the knives 8 and 11.

Figure 12:
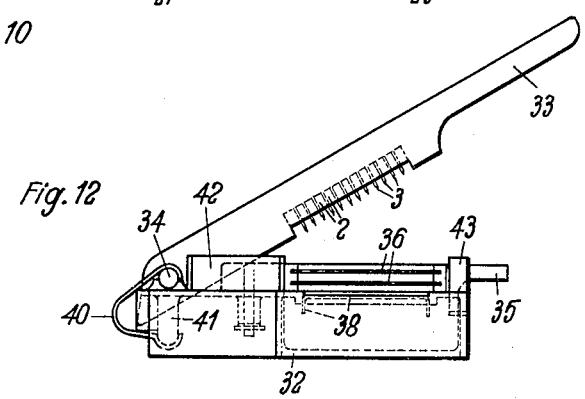
Fig. 12 is a side view of construction similar to that of Fig. 7 but including a set of horizontal cutting knives.
Figure 13:
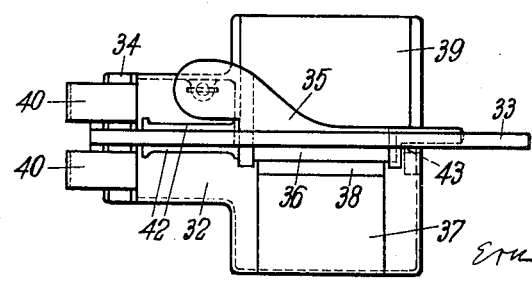
Fig. 13 is a plan view of the structure of Fig. 12.

The example of construction shown in Figs. 12 and 13 resembles in its construction that of Figs. 7 and 8. It has a base 32 on which a lever 33 is vertically swingably mounted by means of a bolt 34. The latter is (like the lever 1 of the mentioned form of construction) provided with intersecting knives 2 and 3. A horizontally swingably mounted lever 35 in the base 32 corresponds to the lever 22 of that construction and bears knives 36 lying over one another, parallel to each other. A depression 37 in the base 32 serves as a supporting table for the onion to be disintegrated. On its cutting edge strengthened with a steel bar or rail it passes over into a lower collecting dish, which is suitable for collecting the chopped up pieces of onion. Moreover two tension springs 40 are provided. They grip at one side on the bearing bolts 34 of the lever 33 and support themselves on the other side at projections 41 which are arranged in hollow rear base portions, accessible from underneath. Because of the action of these tension springs 40, the lever 33 is held fast both in the position of readiness, and also in any definite working position. The provision of these tension springs 40 renders possible a simple construction of the appliance, renders easy the cleaning of the same and keeps the bearing of the lever 33 free from play even after long use. In the region of the cutting edge of the base 32 moreover for guiding the lever 33 two angle projections and a guiding horn 43 are provided.

The mode of action of this appliance is the same as that of the construction shown in Figs. 7 and 8.

Figure 14:
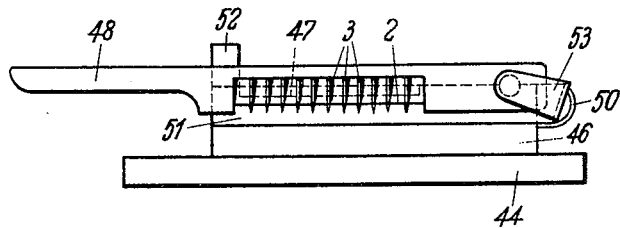
Fig. 14 is a side view of a form of the apparatus applied to a kitchen cutting board, the apparatus omitting the horizontal knives of Figs. 12 and 13.
Figure 15:
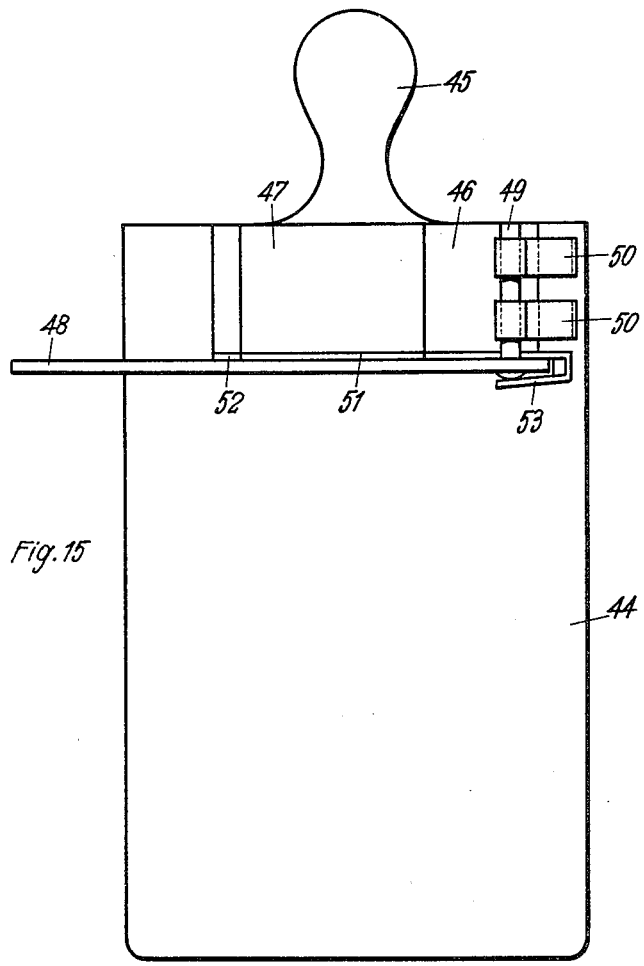
Fig. 15 is a top plan view of the apparatus of Fig. 14.

A specially advantageous construction of the invention is shown in Figs. 14 and 15. It consists essentially in a combination of the previously described appliance with a kitchen cutting up board 44 of wood or the like in the usual form, omitting however the horizontally swingable lever 35.

On the broad edge of this kitchen chopping board 44 provided with a handle 45 is situated a base 46 of wood, artificial resin or the like preferably fastened thereto with screws and having a groove 47 as a support for the material to be cut. On this base 46 is mounted a cutting lever with its axle 49 and in fact this is held in a semi-cylindrical depression by two tension springs 50. By this construction on the one hand the friction between these tension springs and the axle 49 is so large that the cutting lever 48 in fact, as with the previously described form, may remain stationary at any angular position, and on the other hand, however, the apparatus may not be lifted from its supports by the raising of the lever 48. The cutting lever 48 is of the type shown in Figs. 1 and 2, and is provided with intersecting knives 2 and 3. At the edge of the base 46 adjacent the cutting lever 48 a metal rail 51 serving as a cutting edge is provided, this rail being provided at one end with a projection 52 for guiding the cutting lever 48, whilst the other end 53 projects over the base 46, is bent over and lies resiliently on the cutting lever 48.

By omission of the horizontal cutting lever the manipulation of this apparatus becomes relatively simple. The material to be cut, for example a whole onion or half onion, is laid on the groove 47 and moved along in a regular manner towards the cutting edge 51. Before each forward motion, the lever 48 is raised and after displacement forwards depressed again whereby the part of the material to be cut projecting over the cutting edge 51 is cut off and chopped up. The particles cut off fall on to the cutting board and can here be further worked up (for example by fine chopping). Since the actual cutting appliance only takes up a small part of the chopping board 44, it is not in the way for a quite general use of the board.

The manipulation of the appliance according to the invention is extremely simple. It suffices for rapid and effective chopping up of onions and the like and may be simply cleaned by washing under a water jet.

I claim:

1. An apparatus useful for cutting onions or the like, said apparatus comprising a cutting board, a cutting base mounted on said cutting board adjacent an edge of said cutting board, said cutting base being substantially smaller than said cutting board and having a cutting edge located at one side of said cutting base away from the cutting board edge to which said cutting base is adjacent whereby the surface of said cutting board not occupied by said cutting base can form a collecting surface for onions or the like cut at said cutting base, an elongated lever having a handle at one end, means pivotally supporting said lever at the other end for up and down movement with respect to the cutting edge of said cutting base, an integral spring extension at one end of said cutting edge engaging said lever supporting means to bias said lever toward said cutting base, said lever supporting means including means to maintain said lever in any intermediate position against the force of gravity but permitting said lever to be raised without lifting said cutting board, an elongated cutting knife carried by said lever and having a cutting edge adapted to engage the cutting edge of said cutting base in shearing relation, and a plurality of short knives also carried by said lever, said short knives being disposed in transverse relation with respect to said elongated knife and being positioned in spaced apart relation along said elongated knife whereby an onion or the like positioned at the cutting edge of said cutting base may be cut into a plurality of pieces by one cutting movement of said lever.

2. An apparatus useful for cutting onions or the like, said apparatus comprising an elongated cutting board having a handle at one end thereof, a cutting base mounted on said cutting board closely adjacent said handle, said cutting base being substantially smaller than said cutting board and having a separable cutting edge element mounted at the side of said cutting base away from said handle whereby the surface of said cutting board not occupied by said cutting base can form a collecting surface for onions and the like cut at said cutting base, an elongated lever having a handle at one end, means for pivotally supporting the other end of said lever upon said cutting base for up and down movement with respect to the cutting edge element, an integral spring extension on said cutting edge element extending around said other end of said lever and engaging said lever support means to bias said lever against said cutting edge element, said lever supporting means including means to maintain said lever in any intermediate position against the force of gravity but permitting said lever to be raised without lifting said cutting board, an elongated cutting knife carried by said lever and having a cutting edge adapted to engage the cutting edge of said cutting base in shearing relation, and a plurality of short knives also carried by said lever, said short knives being disposed in transverse relation with respect to said elongated knife and being positioned in spaced apart relation along said elongated knife whereby an onion or the like positioned at the cutting edge of said cutting base may be cut into a plurality of pieces by one cutting movement of said lever.

References Cited in the file of this patent

UNITED STATES PATENTS

| | | |
|---|---|---|
| 195,407 | See | Sept. 18, 1877 |
| 487,811 | Whiting | Dec. 13, 1892 |
| 639,231 | Hale | Dec. 19, 1899 |
| 940,252 | Johnson | Nov. 16, 1909 |
| 971,624 | Motter | Oct. 4, 1910 |
| 1,619,746 | Miller | Mar. 1, 1927 |
| 1,996,443 | Pierre | Apr. 2, 1935 |
| 2,458,090 | Miller | Jan. 4, 1949 |
| 2,473,451 | Sciancalepore | June 14, 1949 |

FOREIGN PATENTS

| | | |
|---|---|---|
| 84,393 | Switzerland | Mar. 13, 1920 |
| 99,486 | Switzerland | June 1, 1923 |
| 333,237 | Italy | Dec. 23, 1935 |